United States Patent [19]

Allen

[11] 4,429,444

[45] Feb. 7, 1984

[54] CORK EXTRACTOR

[75] Inventor: Herbert Allen, Houston, Tex.

[73] Assignee: Hallen Company, Houston, Tex.

[21] Appl. No.: 245,584

[22] Filed: Mar. 19, 1981

Related U.S. Application Data

[60] Division of Ser. No. 17,598, Mar. 5, 1979, Pat. No. 4,291,597, which is a continuation-in-part of Ser. No. 925,365, Jul. 17, 1978, Pat. No. 4,276,789.

[51] Int. Cl.[3] .............................................. B23P 13/00
[52] U.S. Cl. ....................................... 29/33 F; 140/86
[58] Field of Search .................. 29/33 F, 557; 140/86; 81/3.45, 3.38, 3.48; 30/346.53

[56] References Cited

U.S. PATENT DOCUMENTS 441,137 11/1890 Clough ................................ 140/86
1,038,692 9/1912 Walker ................................ 140/86
3,203,829 8/1965 Seyer et al. .................. 30/346.53 X

*Primary Examiner*—William R. Briggs
*Attorney, Agent, or Firm*—Browning, Bushman, Zamecki & Anderson

[57] ABSTRACT

The invention pertains to an apparatus for extracting a cork from a bottle comprising a cork-engaging member, including a corkscrew, and a holder for aligning and guiding the corkscrew, via its own diameter, with respect to the bottle. The corkscrew itself is improved by the provision of an outer layer of friction reducing material such as a tetrafluoroethylene or other suitable plastic. Additionally, the tip portion of the corkscrew is formed in an improved manner which prevents fragments of cork from breaking off and falling into the bottle even though the screw is driven completely through the cork. Also disclosed is an improved method of making such a corkscrew.

5 Claims, 8 Drawing Figures

FIG. 3
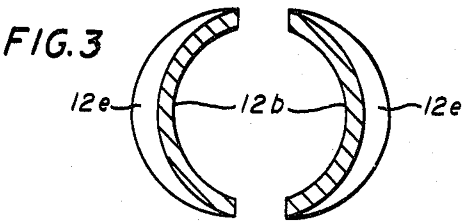
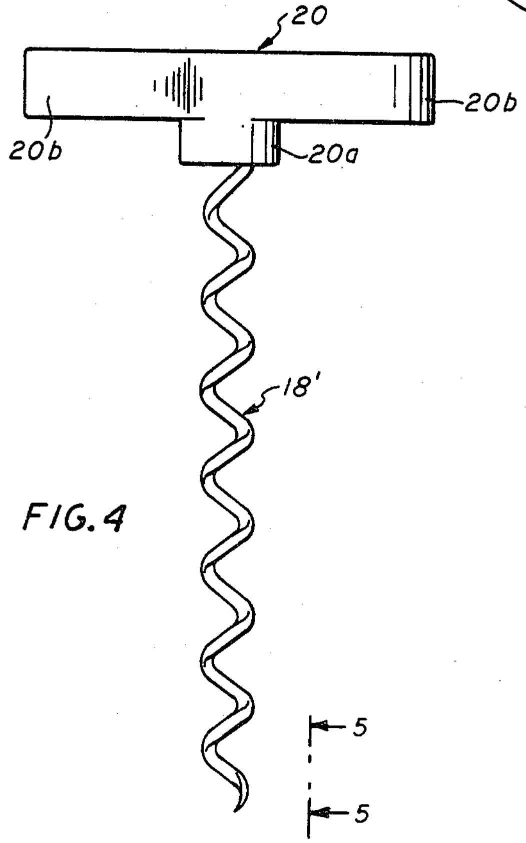
FIG. 4
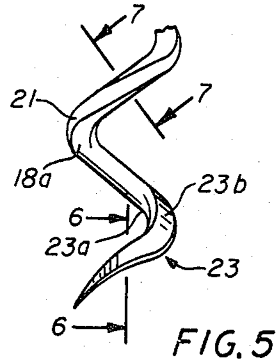
FIG. 5
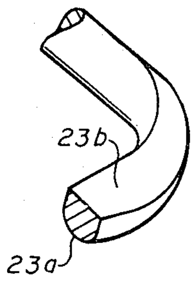
FIG. 6
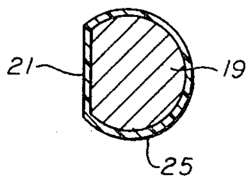
FIG. 7
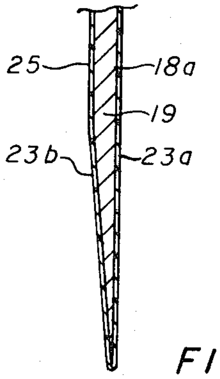
FIG. 8

CORK EXTRACTOR

CROSS REFERENCE TO RELATED APPLICATION

This is a division of application Ser. No. 017,598, filed Mar. 5, 1979· U.S. Pat. No. 4,291,597, which is a continuation-in-part of my prior copending application Ser. No. 925,365 filed July 17, 1978, U.S. Pat. No. 4,276,789.

BACKGROUND OF THE INVENTION

1. Field of the Invention

The present invention pertains to apparatus for extracting corks from bottles. A number of features are desirable in such an apparatus. One of the most important of these is that the corkscrew portion of the apparatus be well centered in the cork during operation, so as to ensure the removal of the entire cork, and minimize the possibility of breaking the cork and permitting the resulting fragments to fall into the wine in the bottle. Another important consideration is that the corkscrew must be pulled in a substantially straight line along its own axis when the cork is being removed, and this axis should ordinarily be substantially aligned with that of the bottle, so as to facilitate removal. Another desirable feature in cork extracting apparatus is the provision of means to reduce the manual force required to drive the corkscrew into the cork and/or to extract the cork from the bottle. There is also a need for preventing small cork fragments from breaking off even if the corkscrew is driven completely through the cork.

2. Description of the Prior Art

Although numerous types of cork extractors have been designed in the past, they have fallen short of adequately filling the various needs described above. More particularly, the prior art has failed to produce a simple, relatively inexpensive device which incorporates all of the aforementioned desirable features.

For example, British Pat. No. 192,503 to Joyce discloses one of the simplest types of such apparatus, merely comprising the corkscrew per se and an attached handle. The handle includes a bevelled surface for abutting the top of the bottle so that, once the screw has been driven into the cork a sufficient distance to achieve such abutment, continued rotation will cause the cork to rise on the corkscrew. This somewhat reduces the force which must be exerted to remove the cork from the bottle, and also provide some small degree of guidance during removal. However, neither the force reduction nor the guidance is satisfactory for the average user.

Various other scemes have been devised for reducing the amount of manual force which must be exerted to remove a cork from a bottle. For example, British Pat. No. 2576 to Chinnock discloses an apparatus having a telescoping base and corkscrew portion with "snail" formations cooperative therebetween to permit the cork to be removed by a continuation of the rotary motion with which the corkscrew is driven into the cork. British Pat. Nos. 14,839 and 570,680 describe somewhat more elaborate mechanisms in which rotation of a handle or the like causes the corkscrew and engaged cork to move upwardly, but without rotation, via a member mounted above the corkscrew and threaded to the rotating handle. Still other devices, exemplified by British Pat. No. 366,435, employ more or less complicated systems of levers in pulling the cork. They are unduly mechanically complicated, which increases their cost as well as their susceptibility to damage and failure. Nevertheless, in spite of their mechanical complexity, they still fail to adequately reduce the necessary manual force, and they fail to provide adequate alignment and guidance of the corkscrew as it is being driven into the cork. Other prior inventors have addressed the alignment/centering/guidance problem, e.g. Campagnolo British Pat. No. 1,188,579 and Becker in British Pat. No. 17,924. However, the devices resulting from such efforts did not adequately solve that problem nor the force reduction problem and/or were as mechanically complicated, or even more so, as the other types of cork extractors discussed hereinabove. In short, the prior art devices require more strength, patience, and/or skill than is possessed by the average user.

SUMMARY OF THE INVENTION

The present invention provides a simple, inexpensive apparatus for extracting a cork from a bottle as well as an improved corkscrew proper which may be used to advantage in said apparatus as well as in virtually any other type of corkscrew or cork extractor. The improved apparatus includes a holder and a cork-engaging member. The cork-engaging member includes the corkscrew per se and abutment means, such as a handle, carried on the corkscrew and engageable with the holder to limit downward movement of the cork engaging member with respect to the holder in use. The holder includes guide means having a guide passageway extending generally longitudinally therethrough. The guide passageway has guide surface means facing generally radially inwardly and is sized to lie closely adjacent the outer diameter of the corkscrew helix, the corkscrew being rotatably and longitudinally movable in the guide passage. The holder further includes stop means engageable with the bottle to limit downward movement of the holder with respect to the bottle as well as grip means spaced downwardly from the guide means and engageable with the bottle to radially align the guide means with the bottle. Thus, the grip means in conjunction with the stop means of the holder serve to generally radially center and coaxially align the guide means, and thus the corkscrew received therein, with the bottle and its cork.

By rotating the cork engaging member and simultaneously exerting a downward force thereon, the corkscrew may be driven into the cork while still properly centered and aligned therewith by the holder. When the abutment means of the cork engaging member comes into abutment with the holder, thereby preventing further downward movement of the cork engaging member, continued rotation of that member in the same direction will cause the cork to rise on the helical corkscrew, the guide means being spaced above the top of the bottle by a sufficient distance to permit such movement.

Another salient feature of the invention is that the cork engaging member is completely separable from the holder. This permits the sharp lower tip of the corkscrew to be used to sever the foil which covers the cork and top of an unopened bottle of wine. The separability of the cork-engaging member also permits it to be used as a simple corkscrew without the holder if, for any reason, such use might be desired. The separability of two main portions of the apparatus also permits each of these portions to be more readily cleaned.

Finally, the corkscrew itself is improved by the provision of a central body, e.g. of high tensile metal, covered by an outer layer of friction reducing material such as polytetrafluoroethylene on at least a portion of the downwardly facing surfaces of the central body. This greatly enhances the ease with which the corkscrew may be driven into the cork. This friction reducing expedient not only virtually eliminates any problem in easily penetrating a tight cork, but also permits the use of design features in the central body, which could not be used without the friction reducing layer, and which themselves enhance the ease of insertion and otherwise improve the corkscrew. Accordingly, the friction reducing layer on the corkscrew is largely instrumental in making the relatively simple apparatus described above effective in easily penetrating and properly removed even extremely hard and/or tight corks. However, such friction reducing layer can also be used advantageously in virtually any type of corkscrew or cork extracting apparatus.

In some instances, e.g. where the apparatus merely comprises a simple corkscrew, it may be preferable to provide the friction reducing layer along substantially the entire length of the central body. However, where the apparatus includes a holder such as that described above, it may be advantageous to coat only the lowermost portion of the central body, preferably that portion which enters the cork before the cork begins to climb the corkscrew and emerge from the bottle neck, for reasons to be developed more fully hereinafter.

The corkscrew also has an improved lower pointed tip portion which is formed in such a way that it eliminates the tendency for small cork fragments to be broken away, even when the corkscrew is driven completely through the cork. This effect is further enhanced by the friction reducing layer mentioned above so that the possibility of contamination of wine by cork fragments is virtually eliminated.

More specifically, the tip portion of the corkscrew has its downwardly facing surfaces on lead with the helix of the downwardly facing surfaces of the upper portion of the corkscrew, i.e. the downwardly facing surfaces of the corkscrew form a continuous helix of constant lead or pitch. The aforementioned friction reducing material is included at least on the downwardly facing tip surfaces. However, the tip portion has its thickness reduced along non-downwardly facing surfaces thereof to form the pointed tip.

The invention also includes an improved method of making a corkscrew including forming a helix from a wire and removing material from surfaces of one end portion to form a pointed tip, said surfaces being non-downwardly facing when the helix is disposed vertically with the tip lowermost.

Accordingly, it is a principal object of the present invention to provide an improved corkscrew having an outer layer of friction reducing material.

Another object of the present invention is to provide a corkscrew having an improved tip formation.

Still another object of the present invention is to provide an improved method for making a corkscrew.

Other objects, features and advantages of the present invention will be made apparent by the following detailed description of the preferred embodiments, along with the drawings and the claims.

BRIEF DESCRIPTION OF THE DRAWINGS

FIG. 3 is a transverse cross-sectional view taken on line 3—3 of FIG. 1.

FIG. 4 is an elevational view of another embodiment of the cork-engaging member.

FIG. 5 is an enlarged detailed elevational view taken on line 5—5 of FIG. 4.

FIG. 6 is a further enlarged view taken on line 6—6 in FIG. 5.

FIG. 7 is a further enlarged cross-sectional view taken on line 7—7 of FIG. 5.

FIG. 8 is a rectified longitudinal sectional view through the tip portion of the corkscrew.

DESCRIPTION OF THE PREFERRED EMBODIMENTS

Figure 1:
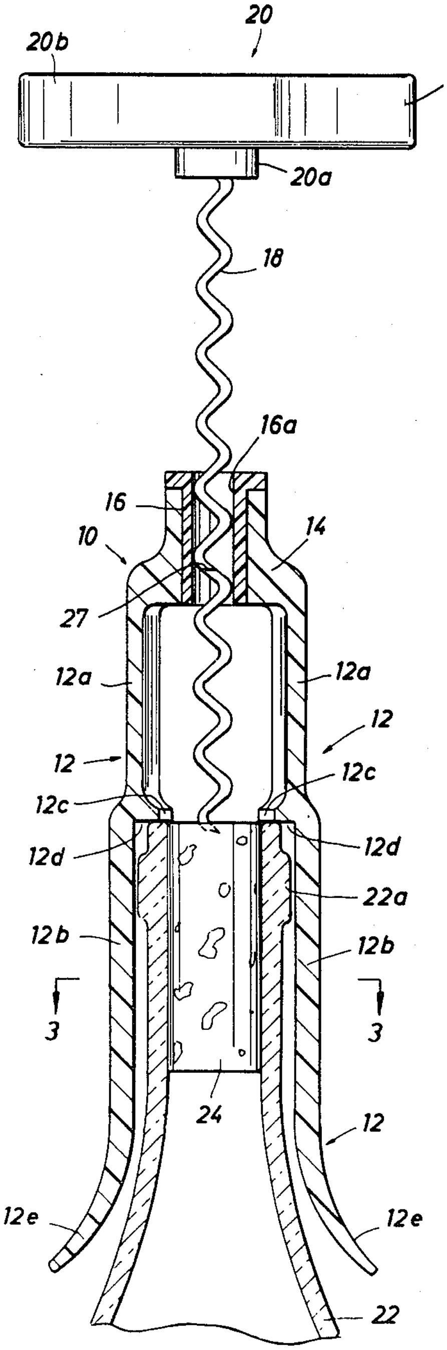
FIG. 1 is a longitudinal sectional view, with some parts being shown in elevation, of a first embodiment of the invention positioned on a bottle for extracting the cork therefrom.
Figure 2:
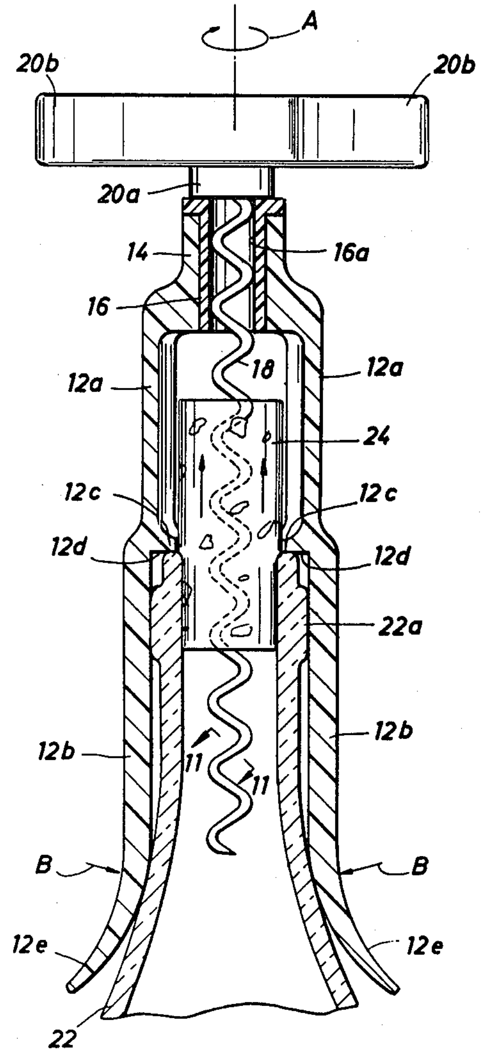
FIG. 2 is a view similar to that of FIG. 1 showing the apparatus in another position as the cork is being removed from the bottle.

FIGS. 1, 2, and 3 generally illustrate a cork extracting apparatus according to the invention, while FIGS. 4–7 show, in greater detail, a cork-engaging member therefor. However, it should be understood that the improvements in the corkscrew portion of the cork-engaging members can also be utilized in virtually any other type of cork extractor, including simple corkscrews as well as more complicated mechanical devices.

Referring first to FIGS. 1 and 2, the apparatus generally comprises two main portions, namely a holder and a cork engaging member. The holder includes a main body member 10 which, in the embodiment shown, is integrally molded from a suitable plastic. The main body member 10 includes a pair of diametrically opposed circumferentially spaced apart, longitudinally extending flexible legs 12, each of which comprises an upper portion **12*a* and a lower portion 12*b*. The main body member 10 of the holder includes an annulus 14 interconnecting and extending upwardly from the upper ends of legs 12. Annulus 14 serves as the foundation portion of the guide means of the holder, said guide means further including a bushing member 16 rigidly mounted within annulus 14 in any suitable manner. Bushing member 15 is preferably formed of a friction reducing material such as polytetrafluoroethylene and is in the form of a sleeve which extends longitudinally along the inner surface of annulus 14 and has an annular flange extending radially outwardly from the upper end and abutting the uppermost surface of annulus 14**. It is noted that, as used herein, terms such as "upper," "lower," "upwardly," and "downwardly" refer to the apparatus as shown in the drawings and as it would be positioned for use on an upright bottle. Such terms are used for convenience, and should not be construed in a limiting sense.

The other major portion of the cork extracting apparatus is a cork engaging member including a helical corkscrew 18 and a handle 20. The corkscrew 18 serves as the guide portion of the cork engaging member and is thus removably receivable in bushing 16 of the guide means of the holder. Corkscrew 18 is longitudinally movable in the bore defined by surface **16*a* either with or without simultaneous rotation. The outer diameter of the helix of corkscrew 18 is sized to lie closely adjacent the cylindrical radially inwardly facing surface 16$a$ of the bushing 16 of the guide means. Additionally, the length of cylindrical surface 16$a$ is at least as long as, and preferably longer than, the pitch of the helix of corkscrew 18. Accordingly, surface 16$a$ serves as the guide surface means of the holder, defining a guide passageway for corkscrew 18 and maintaining it in substantial coaxial alignment with the guide means 14, 16**.

The handle 20 includes a lowermost annular hub 20$a$ and a pair of diametrically opposed radially extending arms 20$b$. Hub 20$a$ is sized and positioned to abut the upper surface of bushing 16 as corkscrew 18 moves downwardly therein to thereby limit downward movement of the cork engaging member 18, 20 with respect to the holder 12, 14, 16.

To use the apparatus, the holder 12, 14, 16 is emplaced over the top of the bottle 22. Each of the legs 12 has a flange 12$c$ extending radially inwardly adjacent the juncture of the upper and lower portions 12$a$ and 12$b$ respectively of the leg. The lower surfaces 12$d$ of the flanges 12$c$ lie in a common plane transverse to the longitudinal axis of the holder. Thus, the surfaces define stop shoulders which abut the top of the bottle 22 and thereby limit downward movement of the holder with respect thereto. Accordingly, when the holder has been thus placed on the bottle 22, as shown in FIG. 1, the holder legs 12 are positioned with the upper portions 12$a$ thereof extending upwardly from the top of the bottle 22 whereby the guide means 14, 16 is spaced from the top of the bottle and a cork receiving space is formed between the upper portions 12$a$ of the two holder legs and intermediate the guide means 14, 16 and the flanges 12$c$.

The lower portions 12$b$ of holder legs 12 extend downwardly along the neck of bottle 22. These portions 12$b$ serve as the gripping elements of the holder. Legs 12 are formed of a suitable lightweight material such as plastic, aluminum, or the like and have sufficient inherent flexibility and resiliency to permit gripping elements 12$b$ to be flexed either inwardly or outwardly from the normal unflexed radial position shown in FIG. 1. Thus, the gripping elements 12$b$ may be grasped and squeezed inwardly by the user with one hand to grip the neck of bottle 22 and firmly position the holder thereon. The flexibility of holder legs 12 also permits the holder to accommodate bottles of different sizes.

Because holder legs 12 are formed of the same material, are substantially identical in size and configuration, and are symmetrically positioned with respect to annulus 14, they are substantially equally biased to the normal unflexed radial position shown in FIG. 1. Accordingly, when they are urged inwardly by the user, as indicated by the arrows B in FIG. 2, they tend to maintain the guide means 14, 16 in a position which is substantially centered with respect to the bottle 22 and its cork 24, even if the diameter of the drip ring 22$a$ of the bottle neck differs from the distance between the adjacent portions of the gripping elements 12$b$. Furthermore, such equal resilient biasing further helps to prevent canting of the holder on the bottle and thereby maintain the axis of the guide means 14, 16 substantially coaxially aligned with that of the bottle 22.

This latter effect is further enhanced by the fact that the stop shoulders 12$d$ define a plane transverse to the two aforementioned axes. In order to take full advantage of this expedient, the gripping elements, i.e. lower portions 12$b$ of the holder legs 12, are flared radially outwardly at their lower ends whereby generally upwardly facing bearing surfaces 12$e$ are formed on their outer sides. This assists the user in squeezing inwardly on gripping elements 12$b$ while simultaneously bearing down on surfaces 12$e$ to thereby hold both shoulders 12$d$ in firm engagement with the top of the bottle.

When the gripping elements are thus employed, they will engage and grip the bottle neck at least at the drip ring 22$a$. It is primarily the flexibility of the upper portions 12$a$ of the holder legs which permits radial flexing of gripping elements 12$b$ to accommodate drip rings of differing sizes. However, gripping elements 12$b$ are additionally flexible and resilient within themselves. Thus, depending upon the diameter of the bottle to be gripped and the length and degree of flexibility of gripping elements 12$b$, the lower ends of the gripping elements 12$b$ may be flexed inwardly to further engage and grip the bottle neck at a second location spaced downwardly from drip ring 22$a$. It has been observed that the tapered necks of most wine bottles reach an outer diameter approximately equal to that of their drip rings at a location around 2 to 2.5 inches (about 5 to 6.5 cm.) below the top of the bottle. Accordingly, if the gripping elements 12$b$ are sized so that there is a like distance between stop shoulders 12$d$ and the points at which the gripping elements 12$b$ begin to flare outwardly, this double gripping action may be more readily achieved with a minimum of distortion of the gripping elements. Nevertheless, even where such double gripping is not possible, due to the size of the bottle and/or the length of gripping elements 12$b$, proper alignment of the guide means 14, 16 with the cork 24 can still be maintained by the combined action of engaging the upper edge of bottle 22 with shoulders 12$d$ and gripping drip ring 22$a$ with gripping elements 12$b$.

In any event, it is desirable to make the gripping elements 12$b$ at least long enough to enable the user to firmly grip the holder in an area primarily surrounding and aligned with the bottle neck, as opposed to an area located generally thereabove. It will also be observed that legs 12 are inwardly concave (as shown in FIG. 3) to enhance the gripping ability thereof.

Referring to FIGS. 1 and 2 together,. the operation of the cork extractor is as follows. After the holder has been emplaced on the bottle as shown in FIG. 1 and described hereinabove, the corkscrew 18 is inserted in the bushing 16 so that its lower end abuts the top of the cork 24. The user then grasps gripping elements 12$b$ with one hand urging them radially inwardly and downwardly (as indicated by the arrow B) to grip the bottle neck as shown in FIG. 2. With the other hand, the user grasps the handle 20 and rotates the cork engaging member 18, 20 (as indicated by arrow A) while simultaneously bearing down on it to drive the corkscrew 18 into the cork 24. The length of corkscrew 18 is such that when hub 20$a$ comes into engagement with the upper surface of bushing 16 thereby limiting further downward movement of the cork engaging member, the corkscrew 18 ordinarily will have been driven through the lower end of cork 24. With a larger cork, the screw may not pass through lower end of the cork when the cork engaging member ceases its downward movement. However it will, in any event, have penetrated a substantial portion of the length of the cork. The user then continues to rotate the cork engaging member 18, 20 in the direction of arrow A. Since the abutment of hub 20$a$ with bushing 16 prevents further downward movement of the cork engaging member, such rotation will cause cork 24 to climb upwardly on the corkscrew 18. The user can observe the cessation of upward movement of cork 24 through the space between portions 12*a* of the two holder legs. He can then remove the holder from the bottle neck along with the cork engaging member and cork. Even if a small portion of the lower end of the cork should still be disposed in the bottle, the cork will at this point have been raised a sufficient distance so that it offers very little resistance to this lifting action. Thus, the user need exert only a very slight upward force to complete the removal of the cork.

The extractor apparatus can then be used to remove the cork 24 from the corkscrew 18. By grasping the holder legs 12 and urging them radially inwardly, the user can grip the cork 24 with the flanges 12*c*. He can then remove the corkscrew 18 by simply rotating handle 20 in a direction opposite to that used to initially drive the corkscrew 18 into cork 24. Alternatively, cork 24 can be gripped by the user's fingers directly through the spaces between upper portions 12*a* of the holder legs.

From the foregoing it can be seen that the apparatus of FIGS. 1, 2 and 3 provides a relatively simple and economical means by which a user can easily and accurately guide the corkscrew into the cork in a centered and coaxially aligned orientation. The holder of the apparatus permits the use to get a firm grip on the bottle while maintaining the guide means steadily aligned with the cork. The guide means in turn properly directs the corkscrew by guiding it via the O.D. of its own helix. Furthermore, it can be seen that the apparatus substantially reduces the force which must be exerted in extracting the cork from the bottle by the threading interaction between the cork and screw, as opposed to a straight pull.

The fact that the cork engaging member 18, 20 is removable from the holder results in additional advantages. Not only does this removability permit the cork engaging member to be used as an ordinary corkscrew, if and when desired, but also allows the sharp end portion thereof to be used to sever the foil covering the top of the bottle before removal of the cork. Furthermore, the separability of the two major portions of the apparatus permits both portions to be more easily cleaned and permits one cork engaging member 18, 20 to be used alternatively with different holders.

The invention further comprises improvements within the corkscrew per se. As best seen in FIGS. 4–8, one embodiment of corkscrew 18' is formed from a length of high tensile metal wire wound into a helix. This wire forms the central metallic body 19 of the corkscrew. The end of the wire destined to be disposed lowermost of distal handle 20 in the finished product is formed into a pointed tip portion 23. As best shown in FIGS. 5 and 6, no metal is removed from the downwardly facing surfaces 23 a of tip portion 23 whereby they remain on lead with the helix of the downwardly facing surfaces, 18*a* of the main portion of the corkscrew thereabove, i.e. surfaces 18*a* and 23*a* define a continuous helix of constant lead or pitch. However, the thickness of tip 23 is reduced along non-downwardly facing surfaces, and preferably substantially upwardly facing surfaces 23*b* to form the pointed tip. As used herein, a surface will be considered "downwardly" facing if a vector extending away from the surface and normal thereto has a vertically downwardly directed vector component. The reduction in thickness to form surfaces 23*b* may be performed by any suitable metal removing thickness. FIG. 8 is a rectified longitudinal sectional view of the lower part of corkscrew 18', i.e. as if the helical wire were straightened. The surface 23*b* preferably extends along a length of said wire sufficient to form a full turn of the helix, although shorter ground surfaces may also be satisfactory.

Finally, the wire or central body 19 is coated with a layer 25 of friction reducing material. For the sake of clarity of illustration, layer 25 is shown only in FIGS. 7 and 8. The friction reducing material of layer 25 may be a polytetrafluoroethylene or any other suitable material bonded to central body 19 by techniques known in the art. As used herein, the term "friction-reducing" will be construed to cover any material which reduces the friction between the corkscrew and cork to a significantly greater degree than could be achieved by merely polishing the central body. Although the polytetrafluoroethylenes, and similar plastics produce particularly striking results, other materials such as molybdenum disulfide or silicone coatings could also be used.

The primary purpose of layer 25 is to increase the ease with which the corkscrew may be driven into the cork. Referring again to the embodiment shown at 18 in FIG. 1, the layer 25 is provided only on the lower portion of the corkscrew, terminating at line 27. This lower portion includes the part of the corkscrew which is driven into the cork before the latter begins to rise on the corkscrew, the upper uncoated portion of the corkscrew being spaced from the bottle neck by the holder. When the cork begins to rise in this manner, it also begins to emerge from the bottle, and as it so emerges, it expands so that its friction against the corkscrew is drastically reduced. Thus, the need for the friction reducing material is much less along the upper portion of the corkscrew which, due to the abutment between the handle 20 and the bushing 16 and the spacing of bushing 16 from the upper end of the bottle neck, is permitted to engage the cork only as it emerges from the bottle in an expanded state.

Accordingly, while leaving the upper portion of the corkscrew uncoated does not substantially detract from the performance of the apparatus, it may decrease the cost of production. Additionally, it is primarily the upper portion of the corkscrew which engages the bushing 16. If this upper portion were coated with the friction reducing material, depending on the type of friction reducing material employed, such engagement could facilitate wearing away of the material from the upper portion of the corkscrew thereby detracting from its appearance. Thus, in some embodiments, particularly those including a holder of the type shown in FIGS. 1–3, it may actually be preferable to provide the friction reducing material only on the lower portion of the corkscrew.

In other embodiments, however, especially those involving only a simple corkscrew and handle without a holder, it may be preferable to coat a greater portion of the central body of the corkscrew. FIGS. 4–8 disclose such an embodiment, designed to be used either alone as a simple corkscrew or with a holder of the type shown in FIGS. 1–3, and in which the corkscrew 18' has its central body 19 coated along its entire length, exclusive of the end portion received in handle 20, with the friction reducing layer 25.

To reduce the possibility of wear of such layer 25 from the upper portion of central body 19, the wire of said body is ground to form a radially outwardly facing flat 21 to provide a greater surface area for contact with bushing 16.

In any event, it has been found that, where a plastic friction reducing material such as polytetrafluoroethylene is used, even if such material does appear to wear away from the central body (including its lower portion) in use, a certain amount of the plastic remains in the surface of the metal body 19. Thus, such wear does not substantially change the ability of the corkscrew to penetrate a cork. On the contrary, any differences in the ease of penetration due to normal wear is negligible.

In both corkscrew embodiments 18 and 18', the friction reducing layer extends about the entire circumference of the underlying wire. However, good results can still be obtained by coating only the downwardly facing surfaces, such as **18*a* and 23*a*. Likewise, while the coating preferably extends over the lower portion of the corkscrew for a length at least approximately equal to the length of an average cork, i.e. about 5 cm. a substantial increase in the ease of insertion may be obtained by coating only the tip portion 23 or the lower surfaces 23*a*** thereof.

Friction reducing coatings as described above have been found to dramatically increase the ease with which a corkscrew such as 18 or 18' may be driven into a cork. Indeed, the reduction in friction is so great as to permit the use, in central body 19, of design features and parameters which would not be practicable without layer 25. For example, the wire of which body 19 is formed may be thinner than in conventional screws, and a wider range of helix leads is available. Such design features in turn may even further enhance the ease of insertion. Thus, for example, the use of layer 25, especially in cooperation with other friction reducing features made possible thereby substantially ensures the capability of driving corkscrew 18 to a sufficient depth in cork 24, even where the latter is relatively hard and/or tightly engaged in the bottle neck, and even though the central body 19 of the corkscrew might be so flexible that it would, in the absence of layer 25, be unwound or otherwise distorted in an attempt to drive it into a cork.

The manner in which tip portion 23 is formed, together with the use of friction reducing layer 25, substantially eliminates the tendency for small fragments of cork to be broken off and fall into the bottle even though the tip portion 23 is driven completely through the lower end of the cork. As noted hereinabove, the removal of the material from tip portion 23 to reduce its thickness and form a point is from non-downwardly facing surfaces **23*b*. The surfaces 23*a*, which do have at least some downward component of orientation, remains on lead with the helix defined by the downwardly facing surfaces 18*a* of the main upper portion of the corkscrew, i.e. surfaces 18*a* and 23*a* define a helix of constant lead or pitch. Thus, surfaces 23*a* are also on lead with or parallel to the helical path of movement of the corkscrew through the cork. Accordingly, as tip portion 23 is driven through the cork, the wedging action thereof will exert a compressive force perpendicular to surfaces 23*b* since they are not on lead with or parallel to the path of movement. It can be seen that a vector perpendicular to non-downwardly facing surfaces 23*b* will either face directly vertically upwardly, or will at least have a substantial upward component and no downward component, depending on its precise position on surfaces 23*b*. On the other hand, any vector perpendicular to any portion of surfaces 23*a* will have a vertically downward component, but no force will be exerted in the directions of these latter vectors for reasons mentioned hereinabove. Accordingly, as tip portion 23 breaks through the lower end of cork 24, there will be no downward compressive force on the cork and thus no tendency to break away any small fragments. On the contrary, the compressive force on the cork by the wedging action of tip portion 23** will be directed substantially vertically upwardly and will thus tend to help pull the cork itself in an upward direction.

This effect is further enhanced by the friction reducing coating 25 along at least surfaces **23*a*, and preferably along a greater portion of central body 19. This is due not only to the reduction in friction per se but also to the fact that such reduction in turn permits a smaller diameter wire to be used for the central body. Of course, the smaller the diameter of the wire passing through the cork, the less likely is the change of a piece of cork chipping off. A cork extracting apparatus of the type shown in FIGS. 1-3 and having a corkscrew with a tip portion formed in accord with FIGS. 5 and 6** and also having a small diameter central body fully coated with a layer of a polytetrafluoroethylene has been used in tests with corks of various ages, densities, etc. These preliminary tests have indicated that there is little or no possibility of a chip or fragment of cork breaking away and falling into the bottle as the lower end of the tip portion of the corkscrew breaks through the lower end of the cork.

As mentioned above, the major improvements in the corkscrews 18 and 18', while extremely advantageous in a cork extracting apparatus such as that shown in FIGS. 1-3, are useful in virtually any type of cork extractor. For example, the cork engaging member including corkscrew 18 or 18' and handle 20 can itself be used as a simple corkscrew wherein the friction reducing layer 25 will still operate to substantially facilitate insertion of the screw into the cork, and wherein the formation of tip portion 23, especially when combined with such friction reducing layer, will further operate to prevent the chipping away of cork fragments from the lower end of the cork. Likewise, either or both of these features could be used in other forms of corkscrews, regardless of whether these corkscrews are intended for independent use or are incorporated into some type of mechanical cork extracting machine. Accordingly, it is intended that the scope of the present invention be limited only by the claims which follow.

I claim:

1. A method of forming a corkscrew comprising:

a. forming a helix from a wire;

b. removing material from one end portion of said wire to form a pointed tip portion, said material being removed from surfaces of said tip portion which are generally upwardly facing when said helix is disposed vertically with said tip portion lowermost; and c. leaving the downwardly facing surfaces of said tip portion substantially on lead with the downwardly facing surfaces of said helix.

2. The method of claim 1 wherein said helix is formed prior to the removal of material from said tip portion.

3. The method of claim 2 wherein said wire is comprised of a metal.

4. The method of claim 1 comprising the further step of bonding a friction reducing coating of plastic to at least the downward facing surfaces of said tip portion.

5. The method of claim 4 wherein said friction reducing plastic is a polytetrafluoroethylene.

* * * * *